United States Patent [19]

Sillitto: Hillary G.

[11] Patent Number: 4,714,321

[45] Date of Patent: Dec. 22, 1987

[54] OPTICAL VIEWING APPARATUS

[75] Inventor: Sillitto: Hillary G., Edinburgh, Scotland

[73] Assignee: Ferranti Plc, Cheadle, England

[21] Appl. No.: 889,631

[22] Filed: Jul. 28, 1986

[30] Foreign Application Priority Data

Aug. 6, 1985 [GB] United Kingdom ............... 8519730

[51] Int. Cl.4 .............................................. G02B 27/14
[52] U.S. Cl. ................................................... 350/174
[58] Field of Search ............... 350/174; 356/138, 153, 356/399

[56] References Cited

U.S. PATENT DOCUMENTS 4,015,906  4/1977  Sharon ............................ 356/138
4,367,949  1/1983  Lavering ......................... 356/153

Primary Examiner—John K. Corbin
Assistant Examiner—Vincent J. Lemmo
Attorney, Agent, or Firm—Kerkam, Stowell, Kondracki & Clarke

[57] ABSTRACT

The apparatus permits an external target to be viewed along a sight-line by a sensing device and for the projection of a beam of laser radiation (12) towards the target. The apparatus includes a viewing window (10) transparent to radiation at a wavelength to which the sensing device is sensitive and inclined at an angle to the sight-line. The window (10) has a viewing area through which the target may be viewed and a laser output area through which the laser beam passes. An anti-reflection coating is formed on that surface of the viewing window (10) remote from the target. Optical deflector means (16) are provided for deflecting laser radiation reflected from the other surface of the viewing window in the laser output area into the viewing area of the window for reflection into the field of view of the sensing device.

9 Claims, 3 Drawing Figures

OPTICAL VIEWING APPARATUS

This invention relates to optical viewing apparatus of the type used for optical aiming or tracking systems, and in particular to such apparatus which provide a visible aiming mark for a laser beam projected through the apparatus.

In visual or television-type optical aiming and/or tracking devices it is common to use a laser beam projected along the optical axis of the apparatus towards a target. This may be for the purpose of range-finding or target designation, for example. It is necessary that the observer using the apparatus shall be provided with a suitable aiming mark accurately aligned with the laser beam so that the latter may be accurately directed towards the target. If the aiming mark takes the form of an illuminated graticule where the source of illumination is not the laser itself, then there are clearly problems in achieving and maintaining the necessary alignment. If the laser itself illuminates the graticule then the problem becomes one of providing the observer with sufficient illumination without the risk of eye damage. This has been avoided in existing apparatus by the use of expensive dichroic dielectric beamsplitters which need to be contained in a protected environment.

It is an object of the invention to provide optical viewing apparatus in which the aiming mark is provided by the laser beam without the need for expensive beamsplitters.

According to the present invention there is provided optical viewing apparatus having means for permitting the viewing of an external target along a sight-line by a sensing device and for projecting a beam of laser radiation towards the target, which includes a viewing window transparent to radiation at a wavelength to which the sensing device is sensitive arranged at an angle to the sight-line and having a viewing area through which the target may be viewed by the sensing device and a laser output area through which the beam of laser radiation passes, an anti-reflection coating on the surface of the viewing window remote from the target, and optical deflection means for deflecting laser radiation reflected from the other surface of the viewing window in the laser output area onto the viewing area of the viewing window for reflection by the other surface of the viewing window into the field of view of the sensing device to form an aiming mark.

The invention will now be described with reference to the accompanying drawings, in which.

Figure 1:
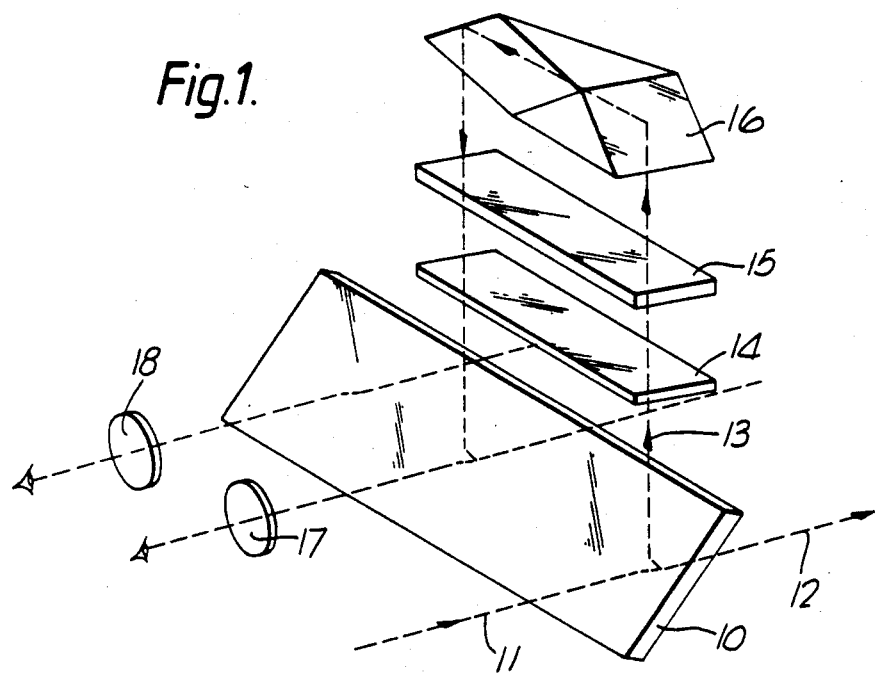
FIG. 1 is a perspective schematic view of one embodiment of the invention.
Figure 2:
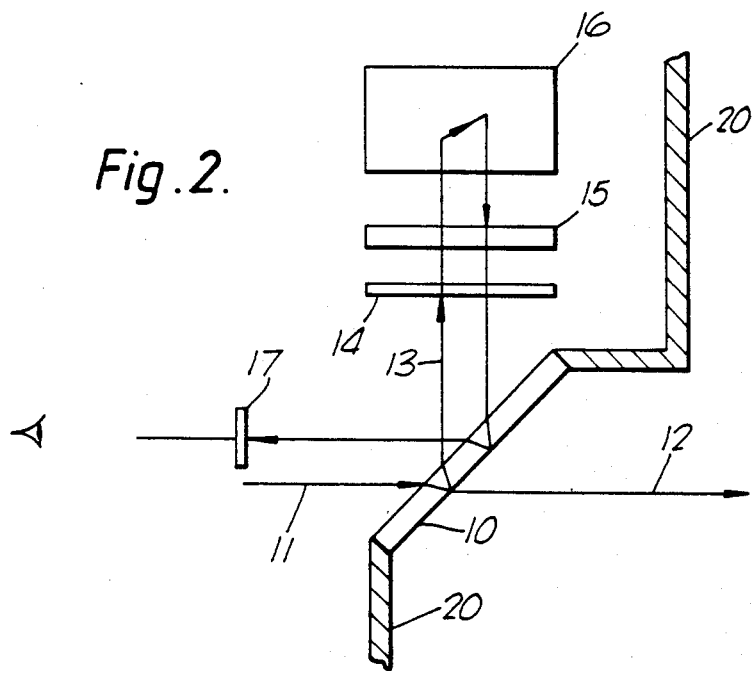
FIG. 2 is a schematic side view of the arrangement of FIG. 1.

Referring now to FIG. 1, this shows a schematic view of an optical viewing device arranged for binocular viewing, the sensing device being the human eye. A viewing window 10, probably forming the external window of a housing or enclosure, is tilted at an angle between 30° and 45° to the vertical. A beam of visible laser light 11 is directed towards the window 10 and the majority of the light is transmitted through the window, with a slight lateral displacement as shown in FIG. 2. The laser light passing through the laser output area of the window 10 forms the laser output beam 12. The inner surface of the window, that is the first surface on which the laser beam is incident, is coated with an anti-reflection coating to prevent reflections from this surface. The other surface of the window is left uncoated, and a small amount of reflection occurs, say about 4%. The reflected light 13 passes through a polariser 14 and a neutral density filter 15 to a truncated corner cube reflector 16. The neutral density filter attenuates the laser light, whilst the corner cube reflector effects a lateral deflection of the light whilst ensuring that light emerging from the reflector 16 is exactly parallel to the light entering the reflector. Since a single narrow-angle beam of laser light is used the entire corner cube reflector is not necessary. The light emerging from the reflector 16 passes again through the neutral density filter 14, which effects a further attenuation, and through the polariser 14, back to the viewing window 10. As before, there is no reflection from the inner surface of the window, and about 4% of the incident light is reflected back from the outer surface of the viewing area of the window towards the observer. In the embodiment shown this small amount of laser light is directed into one eye only of the binocular viewing device through an adjustable polariser 17. A similar polariser 18 is placed in front of the other side of the binocular viewing device so that the fields viewed by each eye of the observer look the same.

The effect of the viewing apparatus described above is to produce in the field of view of the observer a bright aiming spot of light which is exactly aligned with the laser beam, since it is produced by that beam. The intensity of the spot is reduced to an eye-safe level by the losses introduced by the two reflections from the viewing window 10 and by the neutral density filter 15. Further attenuation may be introduced by using an attenuating material for the corner cube reflector 16 or by suitable coating of its reflecting surfaces.

Variable attenuation also needs to be provided to adjust the brightness of the aiming spot as ambient light levels change. This is the function of the fixed polariser 14 and the adjustable polariser 17. The latter may be rotated to give the required brightness of the aiming spot.

Figure 3:
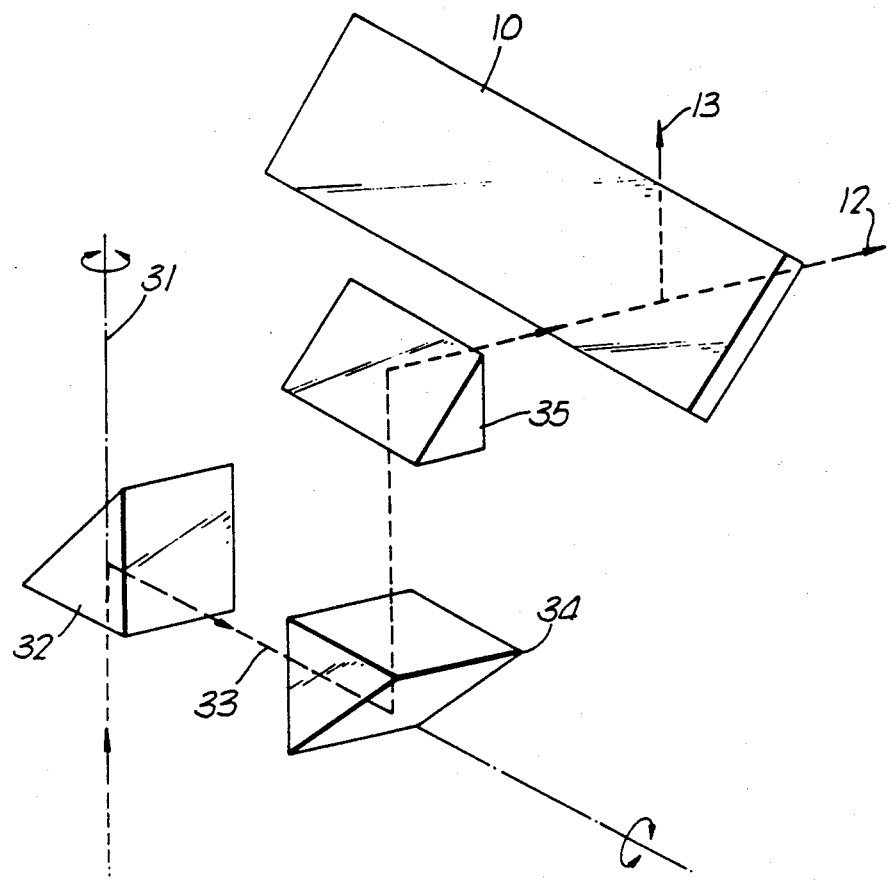
FIG. 3 is a perspective view of additional features of the embodiment of FIG. 1.

The optical components described above may be enclosed in a sealed housing, with the viewing window 10 forming the front window of the housing as shown in part at 20 in FIG. 2, and arranged for a pair of binoculars to be attached to the rear of the housing. Such an arrangement prevents degradation of the optical elements due to dust and other pollutants. It may therefore be impractical to include the laser which produces the beam 11 inside the housing. Since a viewing apparatus must have freedom of movement at least in azimuth and elevation, the laser must either be carried on the viewing apparatus or arrangements must be made to ensure that the laser beam remains parallel to the line of sight during azimuth and elevation movements. FIG. 3 shows an optical arrangement which allows this to be done. Referring to FIG. 3, the laser is positioned so that the laser beam 11 enters the viewing apparatus along the azimuth axis 31. The beam is reflected through 90° by a prism 32 and is then directed along the elevation axis of the apparatus 33. A second prism 34 directs the beam vertically and a third prism 35 then directs the laser beam on to the viewing window 10 to form the output beam 12 and the reflected beam 13. This arrangement allows the viewing apparatus to be rotated in azimuth and elevation whilst maintaining the alignment of the laser beam to the viewing apparatus.

The embodiment described was arranged for direct binocular viewing by an observer. Clearly monocular viewing may be provided with very little change to the apparatus described. The direct viewing by an observer may be replaced by remote viewing by using a sensing device such as a television camera or a thermal imaging device. In such cases the eye-damage problem does not arise, though care will still have to be taken to ensure that the camera or imager is not itself damaged. The wavelength of the laser output will depend upon the sensor being used. For a thermal image the laser output should be in the infra-red region.

Contamination of the outer surface of the viewing window will affect the aiming spot, and this will give an indication that cleaning of the window is necessary.

The corner cube prism 16 may be solid or hollow. The use of a solid prism, whilst adding to the weight of the apparatus, will enable an attenuating material to be used if necessary. The alignment of the corner cube reflector with respect to the other optical elements may be varied from that shown, and the first reflecting surface may be separate from and spaced from the two roof reflecting surfaces.

The window 10, polariser 14 and filter 15 must have optically flat surfaces, though these surfaces do not need to be parallel to one another. The corner cube reflector 16 must be made so as to produce exactly 180° deviation to provide the accurate relationship between the aiming spot and the laser beam.

A shutter may be provided outside the housing 20 to block the transmitted laser beam 20 whilst enabling the observer to view the scene without the possible detection of the laser radiation. The shutter is removed when the laser beam is to be transmitted for ranging or target marking purposes. The shutter must have a non-reflecting surface facing the window 10 so that laser radiation cannot be reflected back into the eyes of the observer.

What we claim is:

1. Optical viewing apparatus having means for permitting the viewing of an external target along a sight-line by a sensing device and for projecting a beam of laser radiation towards the target, which includes a viewing window having two surface and transparent to radiation at a wavelength to which the sensing device is sensitive arranged at an angle to the sight-line and having a viewing area through which the target may be viewed by the sensing device and a laser output area through which the beam of laser radiation passes, an anti-reflection coating on that surface of the viewing window remote from the target, and optical deflection means for deflecting laser radiation reflected from the other surface of the viewing window in the laser output area into the viewing area for reflection by the other surface of the viewing window into the field of view of the sensing device to form an aiming mark.

2. Apparatus as claimed in claim 1 in which the viewing window forms an external window of a housing enclosing the viewing apparatus.

3. Apparatus as claimed in claim 1 in which the sensing device is a human eye and which includes optical attenuating means for attenuating that portion of the laser radiation reflected from the viewing window to an eye-safe level.

4. Apparatus as claimed in claim 1 in which the optical deflection means includes a corner cube reflector.

5. Apparatus as claimed in claim 4 in which the corner cube reflector is made from a material which attenuates the laser radiation passing through it.

6. Apparatus as claimed in claim 1 which includes a neutral density filter located between the viewing window and the optical deflection means.

7. Apparatus as claimed in claim 1 which includes intensity control means for varying the intensity of the laser radiation reflected into the field of view of the sensing device relative to the intensity of illumination of the target as viewed by the sensing device.

8. Apparatus as claimed in claim 7 in which the intensity control means includes a first polariser located between the viewing window and the optical deflection means and a second polariser rotatable relative to the first polariser and located adjacent to the sensing device.

9. Apparatus as claimed in claim 1 which is movable about azimuth and elevation axes and in which the beam of laser radiation passes from a laser source to the viewing window along the azimuth and elevation axes in succession.

* * * * *